(12) United States Patent
Huang et al.

(10) Patent No.: US 12,360,840 B2
(45) Date of Patent: Jul. 15, 2025

(54) FAULT-TOLERANT SYSTEM WITH MULTI-CORE CPUS CAPABLE OF BEING DYNAMICALLY CONFIGURED

(71) Applicant: ZHEJIANG UNIVERSITY, Zhejiang (CN)

(72) Inventors: Kai Huang, Zhejiang (CN); Siheng Chen, Zhejiang (CN); Xiaowen Jiang, Zhejiang (CN); Xiaoxu Zhang, Zhejiang (CN); Zhili Liu, Zhejiang (CN); Wenyuan Xu, Zhejiang (CN); Yonggang Peng, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 25 days.

(21) Appl. No.: 18/346,753

(22) Filed: Jul. 3, 2023

(65) Prior Publication Data

US 2023/0350746 A1    Nov. 2, 2023

Related U.S. Application Data

(63) Continuation of application No. PCT/CN2021/105087, filed on Jul. 8, 2021.

(30) Foreign Application Priority Data

Jan. 7, 2021   (CN) .......................... 202110017368.9

(51) Int. Cl.
   *G06F 11/18*    (2006.01)
   *G06F 11/07*    (2006.01)
(52) U.S. Cl.
   CPC ...... *G06F 11/0793* (2013.01); *G06F 11/0724* (2013.01)

(58) Field of Classification Search
   CPC ............ G06F 11/0793; G06F 11/0724; G06F 11/1405; G06F 11/1407; G06F 11/184
   See application file for complete search history.

(56) References Cited

U.S. PATENT DOCUMENTS

| 5,572,663 | A | * | 11/1996 | Hosaka | ................. | G06F 11/182 |
| | | | | | | 714/797 |
| 6,550,018 | B1 | * | 4/2003 | Abonamah | ............. | G06F 11/18 |
| | | | | | | 714/6.32 |

(Continued)

FOREIGN PATENT DOCUMENTS

| CN | 103870353 | 6/2014 |
| CN | 111581003 | 8/2020 |

(Continued)

OTHER PUBLICATIONS

"International Search Report (Form PCT/ISA/210) of PCT/CN2021/105087", mailed on Sep. 23, 2021, with English translation thereof, pp. 1-4.

(Continued)

*Primary Examiner* — Joseph O Schell
(74) *Attorney, Agent, or Firm* — JCIPRNET

(57) ABSTRACT

The present invention relates to the technical field of central processing units (CPUs), and in particular to a fault-tolerant system with multi-core CPUs capable of being dynamically configured. The multi-core CPUs are three reconfigurable CPUs, the fault-tolerant system with multi-core CPUs is statically configured to be in a normal fault-tolerant mode, a reliable fault-tolerant mode or a performance mode by means of configuration of the three CPUs and then is switched between the normal fault-tolerant mode, the reliable fault-tolerant mode and the performance mode according to a mode switching command of a mode switching (Continued)

register, and finally, the three CPUs are correspondingly configured according to the mode to be switched.

6 Claims, 8 Drawing Sheets

(56) References Cited

U.S. PATENT DOCUMENTS

| | | | |
|---|---|---|---|
| 7,743,285 B1 * | 6/2010 | Aggarwal | G06F 11/181 |
| | | | 714/43 |
| 7,908,520 B2 | 3/2011 | Avizienis | |
| 8,037,350 B1 * | 10/2011 | Aggarwal | G06F 11/1641 |
| | | | 714/10 |
| 2007/0220367 A1 * | 9/2007 | Smith | G06F 11/184 |
| | | | 714/48 |
| 2009/0313311 A1 * | 12/2009 | Hoffmann | G06F 11/2097 |
| 2020/0348985 A1 * | 11/2020 | O'Bleness | G06F 9/5038 |

FOREIGN PATENT DOCUMENTS

| | | | |
|---|---|---|---|
| CN | 112667450 | | 4/2021 |
| JP | 2009516277 A | * | 4/2009 |

OTHER PUBLICATIONS

"Written Opinion of the International Searching Authority (Form PCT/ISA/237) of PCT/CN2021/105087", mailed on Sep. 23, 2021, pp. 1-4.

* cited by examiner

FAULT-TOLERANT SYSTEM WITH MULTI-CORE CPUS CAPABLE OF BEING DYNAMICALLY CONFIGURED

The present application is a continuation of international PCT application serial No. PCT/CN2021/105087 filed on Jul. 8, 2021, which claims the priority benefit of China application No. 202110017368.9 filed on Jan. 7, 2021. The entirety of each of the above-mentioned patent applications is incorporated herein by reference and made a part of this specification.

TECHNICAL FIELD

The present invention relates to the technical field of central processing units (CPUs), and in particular to a fault-tolerant system with multi-core CPUs capable of being dynamically configured.

BACKGROUND ART

Development of integrated circuits for decades has not only provided basic guarantees for national economic prosperity, social progress, national security and other aspects, but also changed people's production method, life style and way of thinking, which is closely related to development of digital SoC (System on Chip) chips towards miniaturization, lightweight, high performance, low power consumption and other characteristics. Meanwhile, the development of these technologies also brings higher CPU failure rate. In addition to consumer electronics in life, industrial production is also more dependent on advantages of the digital SoC chips. Compared with consumer chips, industrial-grade chips are in a harsher environment, and have higher requirements for reliability and higher fault cost. As requirements of modern application scenarios on SoC performance become higher, due to limitations of semiconductor process and power consumption, it is difficult to maintain Moore's Law only by increasing a frequency of a single core, and homogeneous multi-core CPUs emerge. A homogeneous multi-core CPU chip gathers multiple general-purpose CPU cores with equal status and the same structure, which meets the needs of system performance improvement, load balancing and CPU fault tolerance with minimum cost.

Among all kinds of CPU fault types, soft faults are a master cause of CPU failure. Soft faults mainly come from radiation in the universe and α particles in packaging materials. The fault tolerance of CPU soft faults can be divided into a device level, a circuit level and a system level based on different abstract levels. On the basis of related fault-tolerant research at home and abroad and aiming at the defects that a faulty CPU can not be detected for dual modular redundancy faults and triple modular redundancy takes up too many resources, how to improve flexibility and configurability of a CPU redundancy mode is a major problem worth exploring.

SUMMARY

In order to solve the above technical problems in the prior art, mainly aiming at various chip application scenarios of reliability levels, aiming at the defects that a faulty central processing unit (CPU) can not be detected for dual modular redundancy faults and triple modular redundancy takes up too many resources, and in order to improve flexibility and configurability of a CPU redundancy mode, the present invention provides a fault-tolerant system with multi-core CPUs capable of being dynamically configured, and the specific technical solutions thereof are as follows.

A fault-tolerant system with multi-core CPUs capable of being dynamically configured is provided. The multi-core CPUs are three reconfigurable CPUs, the fault-tolerant system with multi-core CPUs is statically configured to be in a normal fault-tolerant mode, a reliable fault-tolerant mode or a performance mode by means of configuration of the three CPUs and then is switched between the normal fault-tolerant mode, the reliable fault-tolerant mode and the performance mode according to a mode switching command of a mode switching register, and finally, the three CPUs are correspondingly configured according to the mode to be switched.

Furthermore, when the fault-tolerant system with multi-core CPUs is switched to the normal fault-tolerant mode, the three CPUs are set as a combination of a dual modular lockstep architecture and single-core independent operation. When the fault-tolerant system with multi-core CPUs is switched to the reliable fault-tolerant mode, the three CPUs are set to be in triple modular redundancy, and when the fault-tolerant system with multi-core CPUs is switched to the performance mode, the three CPUs are set to be in triple-core independent operation.

Furthermore, a dual-core lockstep fault-tolerant method is employed in the normal fault-tolerant mode, the three CPUs are set as a combination of a dual modular lockstep architecture and single-core independent operation, based on the checkpoint method, the two CPUs of the dual modular lockstep architecture run in a master-slave mode to form a self-monitoring pair, and the slave CPU receives the same input data stream as the master CPU and performs the same operation. Moreover, the slave CPU serves as a checker for checking correctness of an output data stream of the master CPU, performs outputting after performing comparison in lockstep modules of the master and slave CPUs, and stores a correct state obtained by means of checking in real time, and resetting and state loading are performed on the master CPU and the slave CPU when a fault occurs.

Furthermore, the reliable fault-tolerant mode is a triple modular redundancy mode, the three CPUs of the triple modular redundancy have the same master CPU input data stream, the input data stream is subjected to parity check coding for fault tolerance, and each 1 bit data stream output is given to an external output signal of the master CPU after triple modular majority voting.

Furthermore, in the triple modular redundancy mode, when it is detected that the output of one CPU is inconsistent with the output of the other two CPUs, a fault count of the current faulty CPU is recorded, that is, a fault counter is added 1 after each time of recording a fault, when the counter counts to a configurable value, it is speculated that the CPU is in an out-of-step operation with the other two CPUs, and re-synchronization is completed by means of resetting and reloading of a correct state.

Furthermore, the three CPUs work independently in the performance mode, input ends of the data streams of the three CPUs select independent input for each CPU, and output ends select independent output for each CPU.

Furthermore, switching between the performance mode and the normal fault-tolerant mode is specifically as follows: a starting time of the system is set to be T0, the three CPUs are CPU0, CPU1 and CPU2 respectively, CPU0 and CPU1 independently run a code, checkpoint saving is performed on the respective operating state at time T1, a saving state of CPU0 is checkpoint A1, and a saving state of CPU1 is checkpoint B1, which are used for subsequent state switching or recovery. Between T1 and T2, CPU0 and CPU1 receive a dual modular redundancy mode switching command, but the command does not take effect at this time. At time T2, CPU0 executes operations of checkpoints A2 and A3, and CPU1 executes operations of checkpoints B2 and B3. The mode switching command takes effect at time T3, an input signal of CPU1 is switched into input of CPU0, output is performed on CPU0 for a fault monitoring pair, and CPU0 and CPU1 are reset at the same time. Moreover, the checkpoint A1 state saved by the master core CPU0 before the mode switching command is initiated is loaded, and after resetting, CPU0 and CPU1 retrieve an address of a next instruction saved in the checkpoint A1 state from a 0x0 address to complete mode switching and run in the normal fault-tolerant mode.

Furthermore, switching between the performance mode and the reliable fault-tolerant mode is specifically as follows: a starting time of the system is set to be T0, the three CPUs are CPU0, CPU1 and CPU2 respectively, which independently run a code, checkpoint saving is performed on the respective operating state at time T1, a saving state of CPU0 is checkpoint A1, a saving state of CPU1 is checkpoint B1, and a saving state of CPU2 is checkpoint C1, which are used for subsequent state switching or recovery. Between T1 and T2, the three CPUs receive a reliable fault-tolerant mode switching command, but the command does not take effect at this time. At time T2, CPU0 executes operations of checkpoints A2 and A3, CPU1 executes operations of checkpoints B2 and B3, and CPU2 executes operations of checkpoints C2 and C3. The mode switching command takes effect at time T3, input signals of CPU1 and CPU2 are switched into input of CPU0, output of the three CPUs is output after majority voting, and the three CPUs are reset at the same time. Moreover, the checkpoint A1 state saved by the master core CPU0 before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

Furthermore, switching between the normal fault-tolerant mode and the reliable fault-tolerant mode is specifically as follows: a starting time of the system is set to be T0, the three CPUs are CPU0, CPU1 and CPU2 respectively, CPU0 and CPU1 run a code in a dual modular redundancy mode, and CPU2 independently runs a code. Checkpoint saving is performed on the respective operating state at time T1, a saving state of the dual modular redundancy mode is checkpoint A1, and a saving state of CPU2 is checkpoint C1, which are used for subsequent state switching or recovery. Between T1 and T2, the three CPUs receive a triple modular redundancy reliable fault-tolerant mode switching command, but the command does not take effect at this time. At time T2, operations of checkpoints A2 and A3 are executed in the dual modular redundancy mode, and CPU2 executes operations of checkpoints C2 and C3. The mode switching command takes effect at time T3, an input signal of CPU2 is switched into input of the dual modular redundancy mode, output of the three CPUs is output after majority voting, and the three CPUs are reset at the same time. Moreover, the checkpoint A1 state saved by the dual modular redundancy mode before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

DETAILED DESCRIPTION OF THE EMBODIMENTS

In order to make the objective, the technical solutions and the technical effects of the present invention more clear, the present invention is further described in detail with reference to the accompanying drawings and examples of the description.

Figure 1:
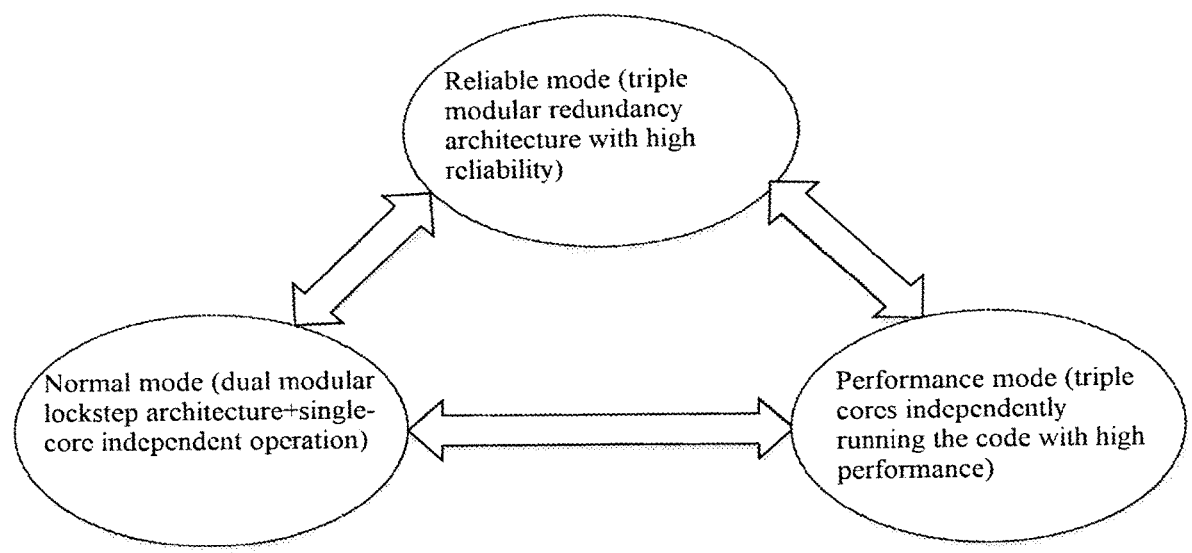
FIG. 1 is a schematic diagram of a configurable triple-core working mode state of the present invention.

In order to meet different application of digital chips aiming at performance and reliability requirements, and satisfy the requirements for resource configurability and high efficiency, as shown in FIG. 1, the present invention provides a fault-tolerant system with multi-core central processing units (CPUs) capable of being dynamically configured, which allows switching between three modes. For the application where the reliability is very important, the present invention defines the mode in which the system is switched as a reliable fault-tolerant mode, i.e., a triple modular redundancy mode. In this mode, the system is configured in a classical triple modular redundancy mode in which output is made in a majority voting mode, and the mode is equipped with an asynchronous detection mechanism to prevent an out-of-step problem in the triple modular redundancy system of the CPUs. In a performance mode, the three CPUs may work independently, implement independent code execution like normal triple-core CPUs, and implement a high-performance processing function. In addition, the present invention further provides a normal fault-tolerant mode between the reliable fault-tolerant mode and the performance mode, that is, a dual modular redundancy mode based on a checkpoint is formed between the CPUs, and another CPU may work independently, such that the performance of computing capability of two CPU systems is ensured on the basis that the master core has a certain fault-tolerant capability. Switching between the three modes is performed under software control, and switching between the three modes is triggered by configuring a special mode switching command of a mode switching register. In addition to the three specific operating modes that can be statically configured, dynamic switching during operation can also be achieved. A fault-tolerant module is mainly composed of two portions: fault detection, and fault isolation and recovery, where the fault detection module is configured to compare operating states of master and slave CPUs in real time and detect potential faults.

Figure 2:
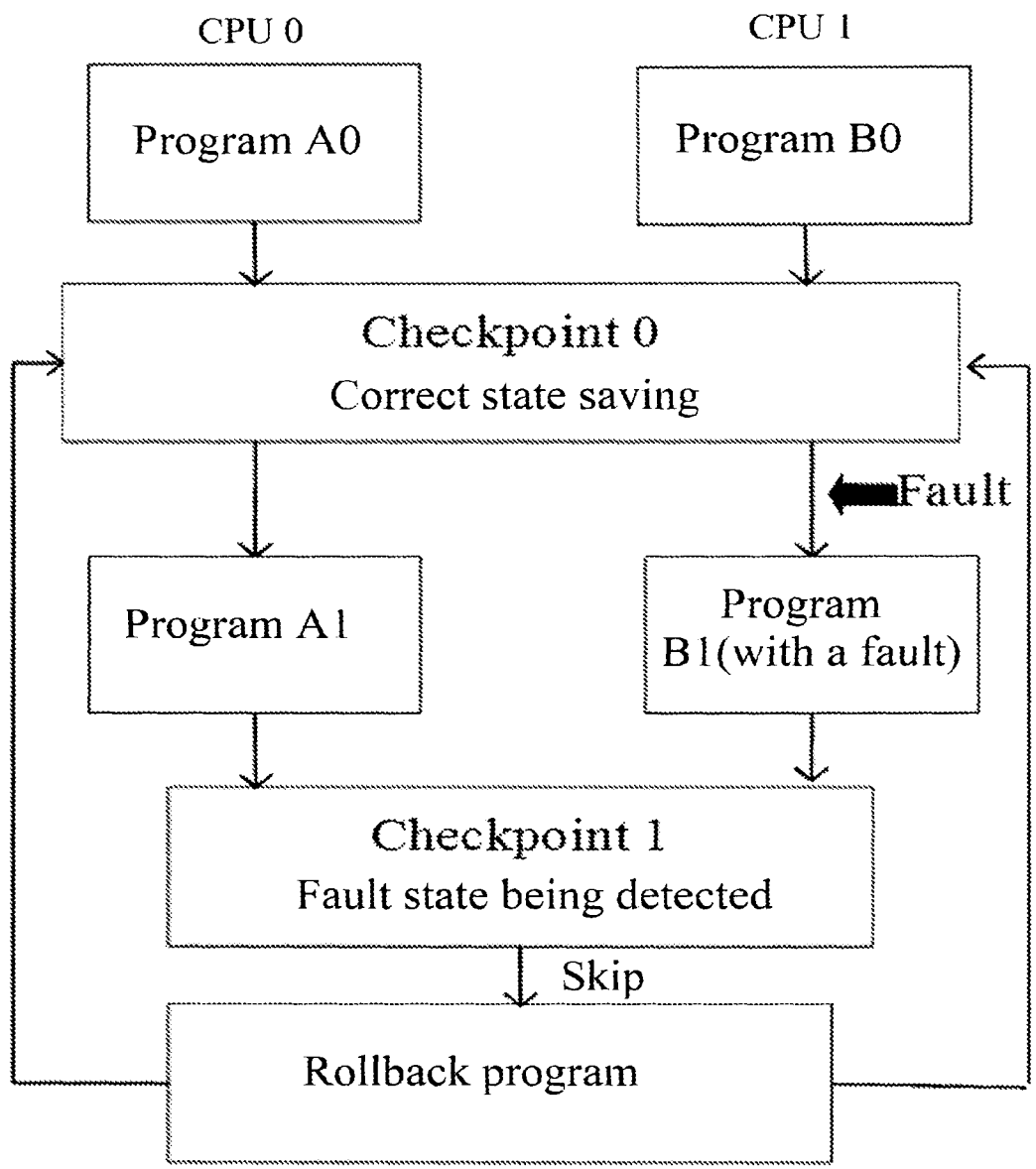
FIG. 2 is a schematic diagram of DCLS fault detection and recovery process based on a checkpoint of the present invention.
Figure 3:
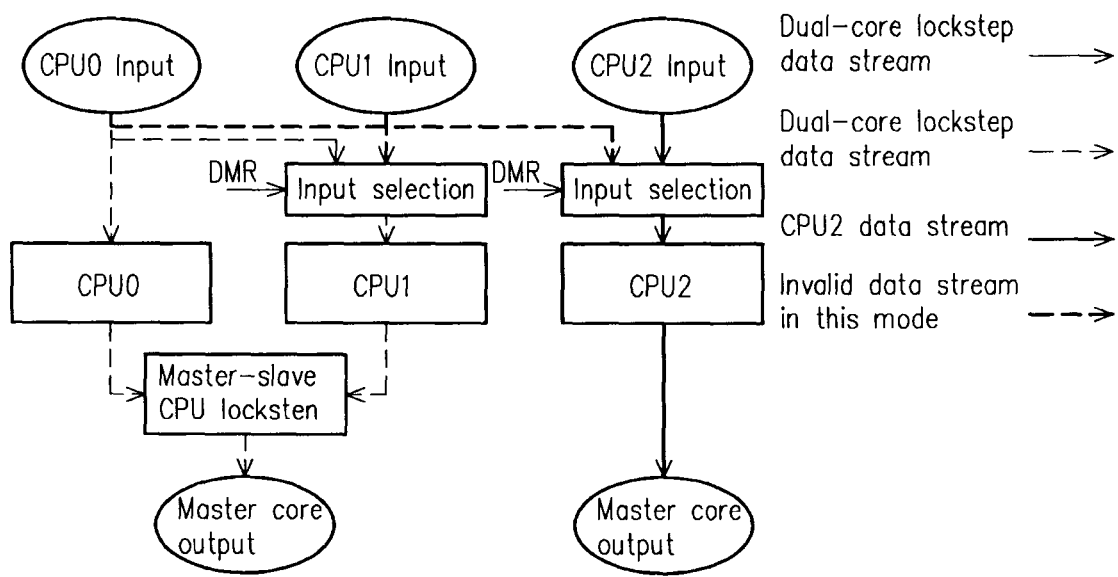
FIG. 3 is a schematic diagram for a data stream flowing direction of CPUs in a normal fault-tolerant mode of the present invention.

As shown in FIG. 2 and FIG. 3, a dual-core lockstep fault-tolerant method is employed in the normal fault-tolerant mode, that is, when the system is in the normal fault-tolerant mode, the three CPUs are set to a combination of a dual modular lockstep architecture and single-core independent operation.

Specifically, based on the checkpoint method, the two CPUs of the dual modular lockstep architecture in the system run in a master-slave mode to form a self-monitoring pair, and the master CPU, CPU0 directly controls a peripheral device, such as a memory or a peripheral module. The slave CPU, CPU1 receives the same input as the master CPU, CPU0, such that the master and slave CPU pair performs the same operation in the normal fault-tolerant mode. The slave CPU, CPU1 serves as a checker, the output is not connected to a peripheral assembly, and is configured to check the correctness of the output of the master CPU, CPU0 for real-time comparison.

In the flowing process of input and output data streams of the three CPUs in the normal fault-tolerant mode, a mode selection signal selects dual modular redundancy (DMR), i.e., the dual modular redundancy mode is enabled, the input data streams of the master CPU, CPU0 and the slave CPU, CPU1 are both from the master CPU, CPU0, the output is compared in lockstep modules of the master and slave CPUs and then is output, and state saving is performed in real time. When a fault occurs, CPU0 and CPU1 are reset and subjected to state loading to complete high-efficiency fault recovery.

The reliable fault-tolerant mode is a mode with the highest fault-tolerant capability, i.e., a triple modular redundancy mode. Triple modular redundancy (TMR) has the capability of protecting a sequential circuit and a combinational circuit, and belongs to a forward fault-tolerant type in which the CPU does not need to return to the previous state. The TMR directly shields a fault and continues to execute a software code. More efficient implementation of the TMR is mainly in circuit sensitive logic, such as a CPU or an internal memory cell, which mainly aims at eliminating all single-point failures from the circuit. Each set of the TMR circuit has the same set of input which is subjected to parity check coding for fault tolerance to avoid faults due to propagation of misinput. Output of each 1-bit data stream is achieved by means of triple modular majority voting logic, and the function of automatic fault detection can be achieved for all the single-point failures.

Figure 4:
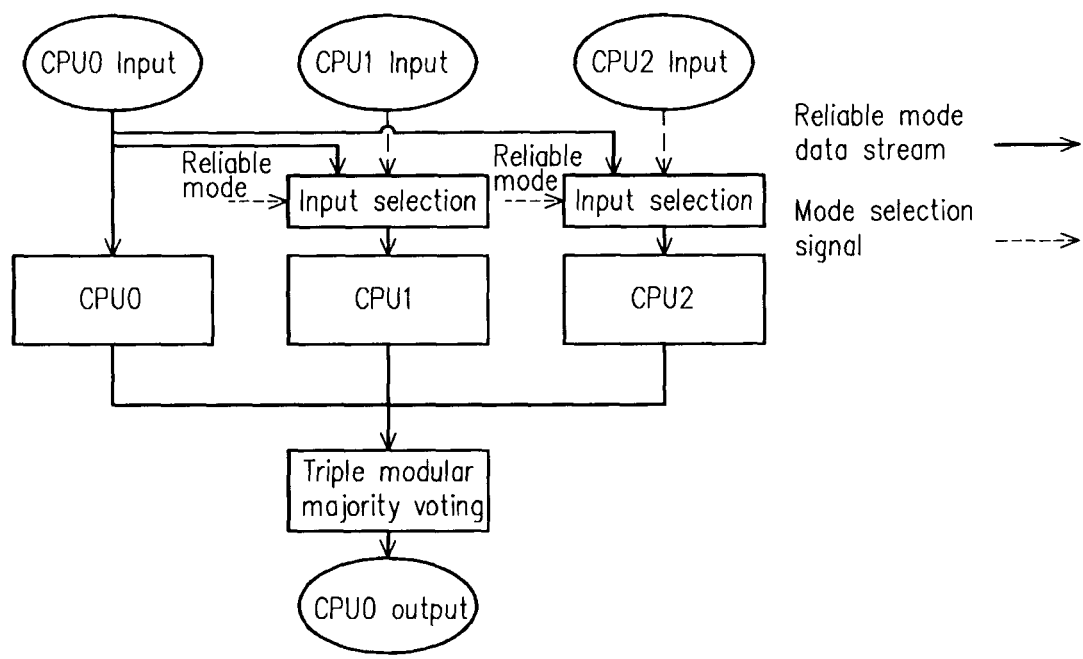
FIG. 4 is a schematic diagram for a data stream flowing direction of CPUs in a reliable fault-tolerant mode of the present invention.

The flowing direction of input and output data streams of the triple modular redundancy is shown in FIG. 4. The reliable fault-tolerant mode is selected as a working mode, the input of the three CPUs is from the master core CPU0, and the output is sent to an external output signal of the master core after passing through a majority voting circuit.

Compared with the limitation of fault tolerance of the dual modular redundancy that information of the specific faulty CPU cannot be obtained by means of comparison, an important advantage of fault tolerance of the triple modular redundancy is that the faulty CPU can be located. In the triple modular redundancy mode, when it is detected that the output of one CPU is inconsistent with the output of the other two CPUs, a fault count of the current faulty CPU is recorded, that is, a fault counter is added 1 after each time of recording a fault. When the counter counts to a configurable value, for example, the output of CPU 1 is inconsistent with the output of the other two CPUs by means of 16 consecutive votes, it is speculated that the CPU is in an out-of-step operation with the other two CPUs, and in this case, re-synchronization is completed by means of resetting and reloading of a correct state.

Figure 5:
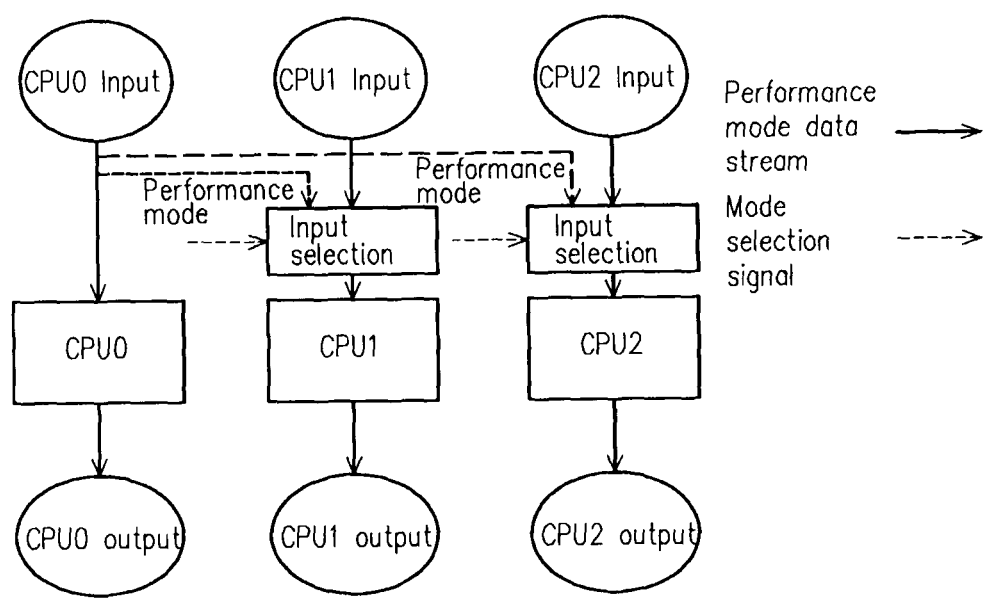
FIG. 5 is a schematic diagram for a data stream flowing direction of CPUs in a performance mode of the present invention.

In the performance mode, the three CPUs work independently, in this case, the system is a normal system with triple-core CPUs, and the three CPUs have independent system buses, data and instruction storage. The flowing direction of input and output data streams of the three CPUs in the performance mode is shown in FIG. 5. Independent input is selected for each CPU at an input end, and independent output is selected for each CPU at an output end. The three CPUs may execute different codes, and performance can be maximized in a software level. However, the CPU in the performance mode has no fault tolerance mechanism, once a valid fault is generated and propagated, it may cause the system to crash.

Figure 6:
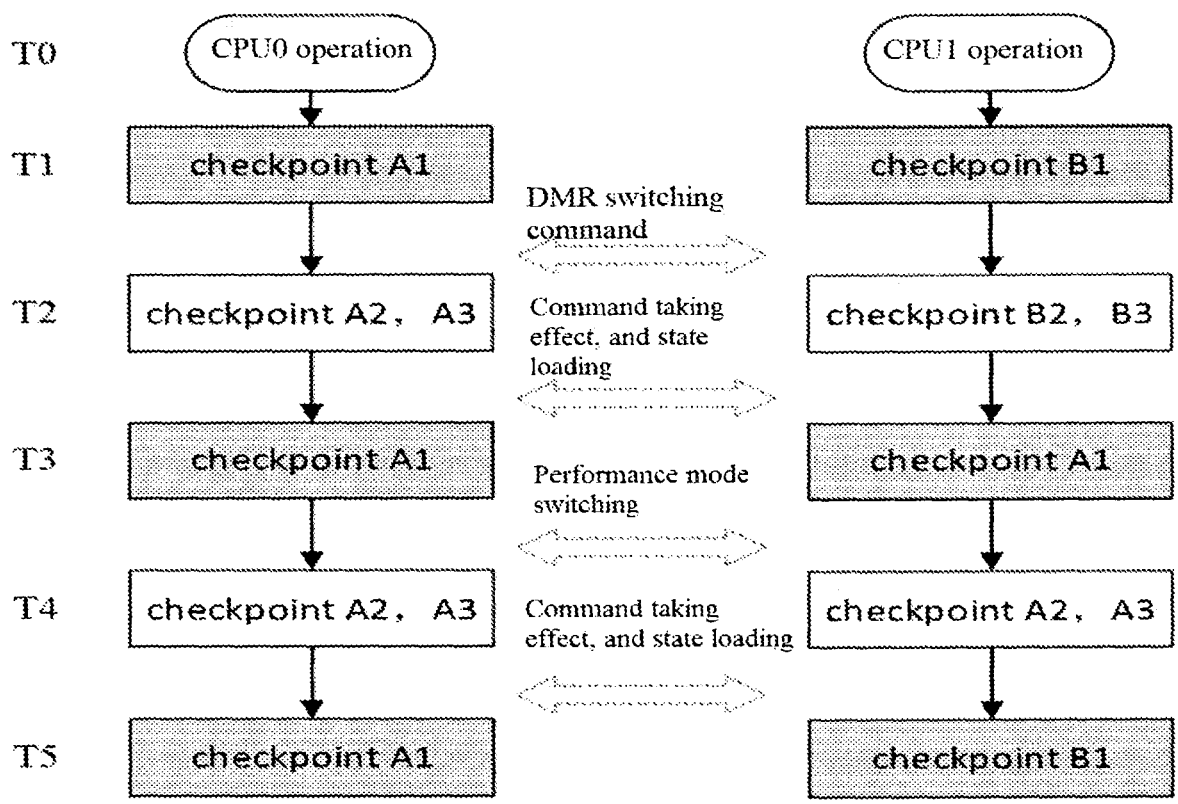
FIG. 6 is a schematic diagram for a switching process between a performance mode and a normal fault-tolerant mode of the present invention.

The normal fault-tolerant mode, the reliable fault-tolerant mode, and the performance mode that can be switched between each other are as follows:

When switching between the performance mode and the normal fault-tolerant mode is performed, the specific steps are as follows:

In the performance mode, the three CPUs independently run the code. In the normal fault-tolerant mode, CPU0 and CPU1 form dual modular redundancy (DMR) fault tolerance, and CPU2 still independently runs the code, such that independent operation of CPU0 and CPU1 and formation of dynamic switching of a DMR fault-tolerant pair are mainly considered in switching between the performance mode and the normal fault-tolerant mode. The switching process is shown in FIG. 6. A starting time of the system is assumed to be T0, CPU0 and CPU1 independently run the code, checkpoint saving is performed on the respective operating state at time T1, a saving state of CPU0 is checkpoint A1, and a saving state of CPU1 is checkpoint B1, which are used for subsequent state switching or recovery. Between T1 and T2, CPU0 and CPU1 receive a DMR mode switching command, but the command does not take effect at this time. At time T2, CPU0 executes operations of checkpoints A2 and A3, and CPU1 executes operations of checkpoints B2 and B3. The mode switching command takes effect at time T3, an input signal of CPU1 is switched into input of CPU0, output is performed on CPU0 for a fault monitoring pair, and CPU0 and CPU1 are reset at the same time. Moreover, the checkpoint A1 state saved by the master core CPU0 before the mode switching command is initiated is loaded, and after resetting, CPU0 and CPU1 retrieve an address of a next instruction saved in the checkpoint A1 state from a 0x0 address to complete mode switching and run in the normal fault-tolerant mode.

Figure 7:
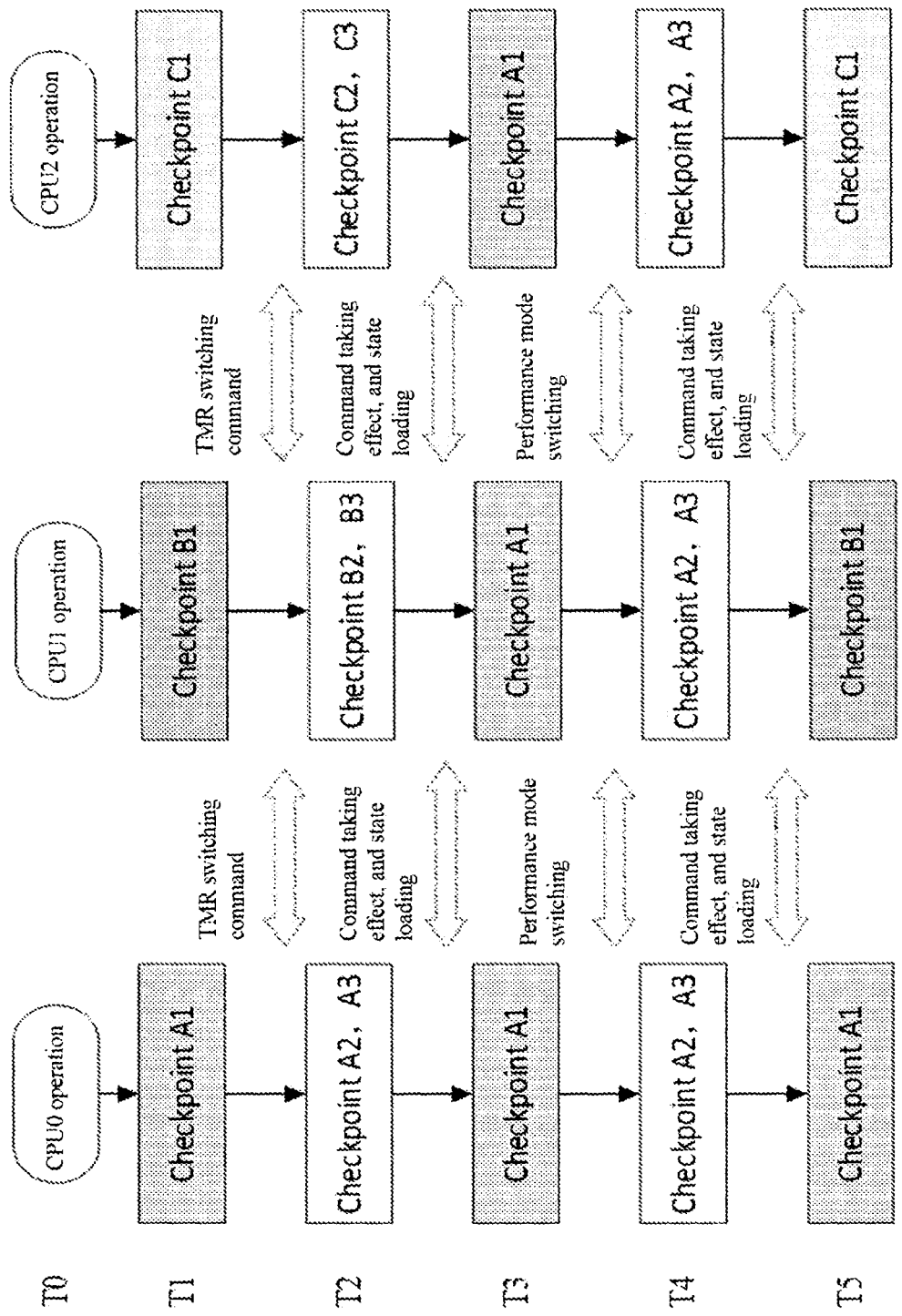
FIG. 7 is a schematic diagram for a switching process between a performance mode and a reliable fault-tolerant mode of the present invention.

When switching between the performance mode and the reliable fault-tolerant mode is performed, the specific steps are as follows:

In the performance mode, the three CPUs independently run the code. In the reliable fault-tolerant mode, CPU0, CPU1 and CPU2 form TMR forward fault tolerance, forward execution is continuously performed after a fault occurs, and rollback is avoided, such that independent operation of CPU1 and CPU2 is synchronized to the operating state of the master core CPU0 to form dynamic switching of TMR fault tolerance, which is mainly considered in switching between the performance mode and the reliable fault-tolerant mode. The switching process is shown in FIG. 7. A starting time of the system is assumed to be T0, CPU0, CPU1 and CPU2 independently run the code, checkpoint saving is performed on the respective operating state at time T1, a saving state of CPU0 is checkpoint A1, a saving state of CPU1 is checkpoint B1, and a saving state of CPU2 is checkpoint C1, which are used for subsequent state switching or recovery. Between T1 and T2, the three CPUs receive a TMR reliable fault-tolerant mode switching command, but the command does not take effect at this time. At time T2, CPU0 executes operations of checkpoints A2 and A3, CPU1 executes operations of checkpoints B2 and B3, and CPU2 executes operations of checkpoints C2 and C3. The mode switching command takes effect at time T3, input signals of CPU1 and CPU2 are switched into input of CPU0, output of the three CPUs is output after majority voting, and the three CPUs are reset at the same time. Moreover, the checkpoint A1 state saved by the main core CPU0 before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

Figure 8:
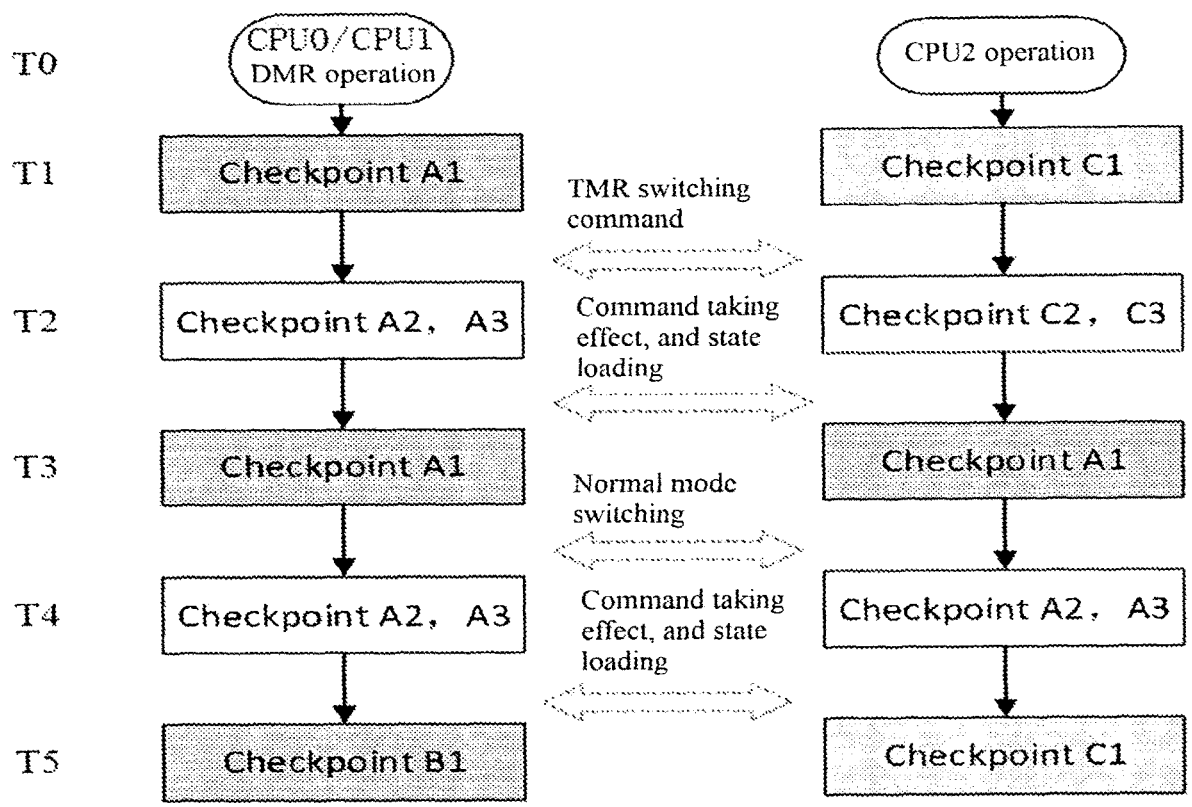
FIG. 8 is a schematic diagram for a switching process between a normal fault-tolerant mode and a reliable fault-tolerant mode of the present invention.

When switching between the normal fault-tolerant mode and the reliable fault-tolerant mode is performed, the specific steps are as follows:

In the normal fault-tolerant mode, CPU0 and CPU1 form DMR fault tolerance, and CPU2 independently runs the code, such that independent operation of CPU2 is synchronized to the DMR operating state of CPU0 and CPU1 to form dynamic switching of TMR fault tolerance, which is mainly considered in switching between the normal fault-tolerant mode and the reliable fault-tolerant mode. The switching process is shown in FIG. 8. A starting time of the system is assumed to be T0, CPU0 and CPU1 run the code in the DMR mode, and CPU2 independently runs the code. Checkpoint saving is performed on the respective operating state at time T1, a saving state of DMR is checkpoint A1, and a saving state of CPU2 is checkpoint C1, which are used for subsequent state switching or recovery. Between T1 and T2, the three CPUs receive a TMR reliable fault-tolerant mode switching command, but the command does not take effect at this time. At time T2, operations of checkpoints A2 and A3 are executed in the dual modular redundancy mode, and CPU2 executes operations of checkpoints C2 and C3. The mode switching command takes effect at time T3, an input signal of CPU2 is switched into input of the DMR, output of the three CPUs is output after majority voting, and the three CPUs are reset at the same time. Moreover, the checkpoint A1 state saved by the DMR before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

More specifically, because there are relatively many register resources temporarily used for checkpoint state saving, and use of dynamic switching is usually not frequent. The system of the present invention only performs a hardware state saving operation on the register of the master core CPU0. For checkpoint state saving operations of the CPU1 and the CPU2, states are saved to an on-chip static random access memory (SRAM) in a software manner, and generally, the dynamic operation can be transparent to the software, such that the software only needs to perform checkpoint state saving when receiving a mode switching signal and perform reading at a recovery time.

The present invention can meet different application of digital chips aiming at performance and reliability requirements, improve flexibility and configurability of the redundancy mode of the CPUs, and satisfy the requirements for resource configurability and high efficiency.

What is claimed is:

1. A fault-tolerant system comprising:
multi-core central processing units (CPUs) capable of being dynamically configured, wherein the multi-core CPUs are three reconfigurable CPUs,
wherein the fault-tolerant system with multi-core CPUs is statically configured to be in a normal fault-tolerant mode, a reliable fault-tolerant mode or a performance mode by configuration of the three CPUs and is switched between the normal fault-tolerant mode, the reliable fault-tolerant mode and the performance mode according to a mode switching command of a mode switching register, and, the three CPUs are correspondingly configured according to which modes the three CPUs are switched;
wherein the fault-tolerant system being switched between the performance mode and the normal fault-tolerant mode is specifically as follows:
setting a starting time of the system as T0, the three CPUs comprising CPU0, CPU1 and CPU2, CPU0 and CPU1 independently running a code;
performing checkpoint saving by the three CPUs on a respective operating state at time T1 of each of the three CPUs, a saving state of CPU0 being checkpoint A1, and a saving state of CPU1 being checkpoint B1, which are used for subsequent state switching or recovery; wherein between T1 and T2, CPU0 and CPU1 receive a dual modular redundancy mode switching command, but the command does not take effect at this time;
at time T2, executing operations of checkpoints A2 and A3 by CPU0, and executing operations of checkpoints B2 and B3 by CPU1;
the mode switching command taking effect at time T3, an input signal of CPU1 being switched into input of CPU0, output being generated by CPU0 for a fault monitoring pair, CPU0 and CPU1 being reset at a same time, the checkpoint A1 state is loaded, and after resetting, CPU0 and CPU1 retrieving an address of a next instruction saved in the checkpoint A1 state from a 0x0 address to complete mode switching and run in the normal fault-tolerant mode; and
when the fault-tolerant system with multi-core CPUs is switched to the normal fault-tolerant mode, the three CPUs being set as a combination of a dual modular lockstep architecture and single-core independent operation,
when the fault-tolerant system with multi-core CPUs is switched to the reliable fault-tolerant mode, the three CPUs being set to be in triple modular redundancy, and
when the fault-tolerant system with multi-core CPUs is switched to the performance mode, the three CPUs being set to be in triple-core independent operation.

2. The fault-tolerant system with multi-core CPUs capable of being dynamically configured according to claim 1, wherein a dual-core lockstep fault-tolerant method is employed in the normal fault-tolerant mode, the three CPUs are set as a combination of a dual modular lockstep architecture and single-core independent operation, based on the checkpoint method, the two CPUs of the dual modular lockstep architecture run in a master-slave mode to form a self-monitoring pair, a slave CPU receives the same input data stream as a master CPU and performs the same operation, the slave CPU serves as a checker for checking correctness of an output data stream of the master CPU, performs outputting after performing a comparison in lock-step modules of the master and slave CPUs, and stores a correct state obtained by checking in real time, and resetting and state loading are performed on the master CPU and the slave CPU when a fault occurs.

3. The fault-tolerant system with multi-core CPUs capable of being dynamically configured according to claim 1, wherein the reliable fault-tolerant mode is a triple modular redundancy mode, the three CPUs when the triple modular redundancy mode have a same master CPU input data stream, the input data stream is subjected to parity check coding for fault tolerance, and 1 bit data stream output is given to an external output signal of the master CPU after triple modular majority voting.

4. The fault-tolerant system with multi-core CPUs capable of being dynamically configured according to claim 3, wherein in the triple modular redundancy mode, when it is detected that an output of one of the three CPUs is inconsistent with outputs of the other two CPUs, a fault count of a current faulty CPU is recorded, a fault counter is incremented after recording a fault, when the counter counts to a configurable value, it is speculated that the CPU is in an out-of-step operation with the other two CPUs, and re-synchronization is completed by resetting and reloading of a correct state.

5. The fault-tolerant system with multi-core CPUs capable of being dynamically configured according to claim 1, wherein switching between the performance mode and the reliable fault-tolerant mode is specifically as follows: a starting time of the system being T0, the three CPUs are CPU0, CPU1 and CPU2 respectively, which independently run a code, checkpoint saving is performed on the respective operating state of each of the three CPUs at time T1, a saving state of CPU0 is checkpoint A1, a saving state of CPU1 is checkpoint B1, and a saving state of CPU2 is checkpoint C1, which are used for subsequent state switching or recovery; wherein between T1 and T2, the three CPUs receive a reliable fault-tolerant mode switching command, but the command does not take effect at this time, at time T2, CPU0 executes operations of checkpoints A2 and A3, CPU1 executes operations of checkpoints B2 and B3, and CPU2 executes operations of checkpoints C2 and C3; and the mode switching command takes effect at time T3, input signals of CPU1 and CPU2 are switched into input of CPU0, output of the three CPUs is output after majority voting, the three CPUs are reset at the same time, the checkpoint A1 state saved by the master core CPU0 before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

6. A method for the fault-tolerant system with multi-core CPUs capable of being dynamically configured according to claim 1, wherein switching between the normal fault-tolerant mode and the reliable fault-tolerant mode is specifically as follows: a starting time of the system being T0, the three CPUs are CPU0, CPU1 and CPU2 respectively, CPU0 and CPU1 run a code in a dual modular redundancy mode, CPU2 independently runs a code, checkpoint saving is performed on the respective operating state at time T1, a saving state of the dual modular redundancy mode is checkpoint A1, and a saving state of CPU2 is checkpoint C1, which are used for subsequent state switching or recovery; between T1 and T2, the three CPUs receive a triple modular redundancy reliable fault-tolerant mode switching command, but the command does not take effect at this time, at time T2, operations of checkpoints A2 and A3 are executed in the dual modular redundancy mode, and CPU2 executes operations of checkpoints C2 and C3; and the mode switching command takes effect at time T3, an input signal of CPU2 is switched into input of the dual modular redundancy mode, output of the three CPUs is output after majority voting, the three CPUs are reset at the same time, the checkpoint A1 state saved by the dual modular redundancy mode before the mode switching command is initiated is loaded, and after resetting, CPU0, CPU1 and CPU2 retrieve an address of a next instruction saved in the checkpoint A1 state from a 0x0 address to complete mode switching and run in the reliable fault-tolerant mode.

* * * * *